United States Patent
Sugikawa

(10) Patent No.: US 6,455,201 B1
(45) Date of Patent: Sep. 24, 2002

(54) METHOD OF MANUFACTURING BATTERY ELECTRODE SUBSTRATE AND BATTERY ELECTRODE SUBSTRATE

(75) Inventor: Hirofumi Sugikawa, Toyonaka (JP)

(73) Assignee: Katayama Special Industries, Ltd., Osaka-Fu (JP)

( * ) Notice: Subject to any disclaimer, the term of this patent is extended or adjusted under 35 U.S.C. 154(b) by 0 days.

(21) Appl. No.: 09/269,708

(22) PCT Filed: Oct. 3, 1997

(86) PCT No.: PCT/JP97/03543

§ 371 (c)(1),
(2), (4) Date: Jun. 7, 1999

(87) PCT Pub. No.: WO98/15021

PCT Pub. Date: Apr. 9, 1998

(30) Foreign Application Priority Data

Oct. 3, 1996 (JP) ................................. 8-263011

(51) Int. Cl.[7] ..................... H01M 4/74; H01M 4/02; B23P 15/22
(52) U.S. Cl. ................. 429/242; 429/211; 29/2
(58) Field of Search ................. 29/2; 429/211, 429/242

(56) References Cited

U.S. PATENT DOCUMENTS

| | | | |
|---|---|---|---|
| 4,317,351 A | | 3/1982 | Borrows |
| 4,865,933 A | * | 9/1989 | Blanyer et al. ............ 429/241 |
| 5,093,970 A | * | 3/1992 | Senoo et al. ..................... 29/2 |
| 5,223,354 A | * | 6/1993 | Senoo et al. ................. 429/242 |
| 5,597,665 A | * | 1/1997 | Harada et al. .............. 429/235 |
| 5,604,058 A | * | 2/1997 | Wirtz ......................... 429/225 |
| 5,611,128 A | * | 3/1997 | Wirtz ............................ 29/2 |
| 5,770,334 A | * | 6/1998 | Kawai et al. ................ 429/211 |
| 5,775,002 A | * | 7/1998 | Iwase et al. .................... 34/122 |
| 5,981,107 A | * | 11/1999 | Hamano et al. ......... 429/231.95 |
| 6,037,081 A | * | 3/2000 | Kashio et al. .............. 429/242 |

FOREIGN PATENT DOCUMENTS

| | | |
|---|---|---|
| DE | 41 30 673 | 3/1993 |
| EP | 492 428 | 7/1992 |
| EP | 651 451 | 5/1995 |
| GB | 1 542 409 | 3/1979 |
| JP | 07335208 | 12/1995 |

* cited by examiner

Primary Examiner—Tom Dunn
Assistant Examiner—Zidia Pittman
(74) Attorney, Agent, or Firm—Sughrue Mion, PLLC

(57) ABSTRACT

Concave portions and convex portions are formed on a peripheral surface of a thin metal sheet by applying a pressing force thereto while the metal sheet is being embossed; pores are each formed on an apex of each of the concave portions and convex portions and burrs each projecting outward from a peripheral edge of each of the pores are generated by the pressing force; the metal sheets having the concave portions and convex portions formed thereon are layered on each other; the burr at the apex of each convex portion of a lower-layer metal sheet is interlocked with the burr at the apex of each concave portion of an upper-layer metal sheet adjacent to the lower-layer metal sheet to integrate the metal sheets with each other; and an active substance is charged into spaces between the upper-layer metal sheet and the lower-layer metal sheet through an aperture at the apex of each of the concave portions and convex portions.

3 Claims, 8 Drawing Sheets

METHOD OF MANUFACTURING BATTERY ELECTRODE SUBSTRATE AND BATTERY ELECTRODE SUBSTRATE

TECHNICAL FIELD

The present invention relates to a method of manufacturing a plate for a battery electrode and the plate for a battery electrode manufactured by the method, and more particularly to the plate for an electrode which is preferably used for a supply battery of an electric car because of a great thickness thereof to increase the amount of an active substance to be applied thereto and because of a preferable contact thereof with the active substance applied thereto to prevent it from dropping therefrom.

BACKGROUND ART

Heretofore, generally, as the plate of an electrode for using a positive electrode and a negative electrode of a nickel/hydrogen battery, a nickel/cadmium battery or the like, principally, a pore-formed nickel-plated steel plate (hereinafter referred to as punching metal) formed by plating an iron plate on which pores are formed by punching is used. An active substance is applied to the punching metal to form the electrode. In the case of a cylindrical battery, the electrode comprising belt-shaped positive and negative electrodes is spirally wound through a separator to accommodate them therein. In the case of a rectangular or square battery, positive and negative electrodes are layered on each other through a separator to accommodate them therein.

The punching metal is used as the plate for a battery electrode by punching a flat cold-rolled steel plate having a thickness of 60 $\mu$m–100 $\mu$m to form thereon circular pores, the diameter of which is 1.0 mm–2.5 mm in a required pattern such that the open area percentage thereof is 40%–50% and then nickel-plating the steel plate to keep it resistant to corrosion.

As the plate of an electrode consisting of positive and negative electrodes of a lithium primary battery, mainly, a lath processed from metal such as SUS and Ti is used. The lath is charged with an active substance to form the electrode. In a lithium secondary battery, the active substance is applied in a required thickness to both surfaces of a metal core material made of an aluminum foil to form a positive electrode, and the active substance is applied in a required thickness to both surfaces of a metal core material made of a copper foil to form a negative electrode.

As the plate of an air electrode to be used as the positive electrode of an air zinc battery, mainly, a metal screen (nickel-plated SUS mesh) is used. As a zinc storage battery which attracts public attention recently as a car battery, a cast lattice or an expanded lattice consisting of lead alloy (Pb/Sb alloy, Pb/Ca alloy, Pb/Ca/Sn alloy or the like) is used. The active substance is applied to the screen and the lattice to form the electrode.

Further, in recent years, as the plate of the electrode of the nickel/hydrogen battery, the nickel/cadmium battery, and the lithium primary battery, porous metal sheets formed by chemically plating resinous foamed materials, nonwoven cloths or mesh materials to make them electrically conductive, and then electroplating them, and then, removing resinous materials and sintering them are also used.

Any of the above-described plates for a battery electrode are flat. An active substance is applied to both surfaces thereof to fill it into pores formed thereon and coat both surfaces thereof with the active substance in a required thickness. Because the above-described punching metal, the lath, and the metal screen are not three-dimensional, they are not in close contact with the active substance and thus have a low active substance-holding force. In particular, if they have large pores formed thereon, the active substance is likely to separate and drop therefrom during the manufacture and use of an electrode. In order to solve the problem, a method of adding a large amount of binder to the active substance to prevent it from separating and dropping from the plate is known. But when a large amount of binder is added to the active substance, the reactivity of the active substance deteriorates, and thus the battery characteristic is inferior.

The active substance is filled into pores of the foamed porous metal sheet having a three-dimensional structure. Thus, the porous metal material has a higher active substance-holding property than the punching metal and the metal screen. But in the foamed porous metal material, the skeleton thereof the pores is not thick. Thus, the foamed porous metal material has a low electricity-collecting performance, thus being incapable of accomplishing a rapid electric charge or discharge when a rapid electric charge or discharge is required.

Because any of the conventional plates for an electrode is thin, the active substance is thinly applied thereto in the thickness direction thereof. Therefore, the electrode has a low electrical conductivity in its thickness direction. Thus, it is difficult to improve the characteristic of the battery.

In order to solve this problem, in Japanese Laid-Open Patent Publications Nos. 7-130370 and 7-335208, there are proposed electrodes having an apparent thickness twice as great as that of a metal plate or a metal foil, including the thickness of burrs each formed on the periphery of each of pores formed on the metal plate or the metal foil by using upper and lower dies. However, when pores are formed by a pair of dies, the maximum open area percentage is about 50%. Further, it is difficult to form many fine pores on the entire surface of the metal plate or the metal foil by reducing the diameter of each pore and the pitch between the pores. Therefore, even though the burr is formed on the periphery of each pore, the burr has a low occupation percentage and an insufficient active substance-holding force. In addition, because the diameter of each pore is large, the active substance charged into the pores is likely to be dropped therefrom. Further, because the pitch between the pores is long, the area of the metal foil or the metal plate is great, which prevents movement of ions in the active substance. Thus, these electrodes cause batteries to have inferior performance. In order to solve these problems, it is conceivable to reduce the diameter of each pore and the pitch between the pores. But it is technically very difficult and very costly to form the pores by a pair of upper and lower dies as described above. Furthermore, only one metal plate having burrs formed thereon does not allow the application amount of the active substance to be increased so much.

The present invention has been made in view of the above-described problems. It is accordingly an object of the present invention to provide a method of manufacturing a plate for a battery electrode which holds an active substance thereon firmly and allows a large amount of the active substance to be applied thereto in the thickness direction thereof and provide the plate for a battery electrode manufactured by the method.

DISCLOSURE OF THE INVENTION

In order to solve the above-described problem, firstly, there is provided a method of manufacturing a plate for a battery electrode comprising the steps of: passing a thin metal sheet between a pair of embossing rotation rollers having concave portions and convex portions formed on a peripheral surface thereof to form concave portions and convex portions on an entire surface of the metal sheet, and form pores each on an apex of each of the concave portions and convex portions and generate burrs each projecting outward from a peripheral edge of each of the pores by a pressing force during formation of the concave portions and convex portions.

According to the above-described method, by merely passing the metal sheet between a pair of the embossing rotation rollers, comparatively fine concave portions and convex portions can be formed on the entire surface thereof, and at the same time, pores are each formed on the apex of each concave portion and convex portion, and the burr can be projected from the peripheral edge of each pore. Thus, according to the method utilizing the embossing method, compared with the conventional method of forming pores by means of upper and lower dies, the diameter of each pore which is formed on the apex of each concave portion and convex portion and the pitch between the concave portions and that between the convex portions can be allowed to be smaller. Therefore, the pitch between the pores each formed at the apex of each of the concave portions and convex portions can be reduced greatly and the open area ratio, namely, the ratio of the area of the pore to the area of the metal sheet can be allowed to be much larger than that of the metal sheet formed by the conventional method using the dies. Because the burr is generated at the apex of each of the concave portions and convex portions formed densely on the entire surface of the metal sheet, the ratio of the area of the burr to the area of the metal sheet can be allowed to be much higher than that of the metal sheet formed by the conventional method.

As described above, fine concave portions and convex portions are formed on the entire surface of the metal sheet, the pores are each formed on the apex of each concave portion and convex portion, and the burrs are each generated on the periphery of each of the pores. Thus, an active substance which can be applied to the metal sheet can be charged into the concave portions and the convex portions and held by the burrs each generated on the periphery of the apex of each of the concave portions and convex portions. Hence, the charge amount of the active substance can be allowed to be much greater than that of the active substance which is applied to the metal sheet by the conventional method. Further, the active substance can be held by the concave portions and the convex portions reliably because the portions are fine and also held reliably by the burrs because the burrs are present densely on the surface of the metal sheet. Thus, the force of holding the active substance can be allowed to be much greater than the force of holding the active substance which is applied to big pores formed at long pitches by the conventional die. In addition, because the open area ratio is high, ions of the active substance move actively, thus improving the performance of a battery.

More specifically, by forming the concave portions and convex portions on the metal sheet itself, the apparent thickness of the metal sheet can be allowed to be a desired thickness 3 to 500 times as large as that of the metal sheet. For example, when convex portions are formed upward and downward on the metal sheet having a thickness of 10 μm to make the thickness thereof 4 mm, the apparent thickness thereof is 400 times as large as the thickness thereof.

Further, secondly there is provided a method of manufacturing a plate for a battery electrode comprising the steps of: passing a thin metal sheet between a pair of rotation rollers, one of which is an embossing roller having concave portions and convex portions formed on a peripheral surface thereof and a other of which is rubber roller having smooth outer surface, to form pores on the metal sheet and generate burrs each projecting toward one side from a peripheral edge of each of the pores by pressing the rubber rollers against the convex portions of the embossing roller.

According to the above-described second method, although clear concave portions and convex portions are not formed on off the metal sheet itself, a large number of pores are formed on the entire surface thereof and a burr projecting in one direction (toward rubber roller) from each pore can be formed. Thus, when the burr is desired to be projected in only one direction, the second method can be preferably used.

Further, thirdly there is provided a method of manufacturing a plate for a battery electrode comprising the steps of: passing a thin metal sheet sequentially between first and second sets of rotation rollers each consisting of an embossing roller having concave portions and convex portions formed on a peripheral surface thereof and rubber roller having smooth outer surface to form pores on the metal sheet and generate burrs each projecting toward one side from a peripheral edge of each of the pores by pressing the rubber roller against said convex portions of the embossing roller when the metal sheet is passing between the embossing roller and the rubber roller of the first set; and passing the metal sheet between the embossing roller and the rubber roller of the second set to form pores on the metal sheet at different positions thereof and generate burrs each projecting toward the other side from the peripheral edge of each of the pores.

Further, fourthly, there is provided a method of manufacturing a plate for a battery electrode. In the fourth method, metal sheets of the same kind or different kinds, according to the first, second, and third methods, having the pores and the burrs each projecting from the peripheral edge of each of the pores are layered one upon another; and the burrs of an upper layer metal sheet and the burrs of a lower layer metal sheet adjacent to the upper layer metal sheet are interlocked with each other to integrate the upper layer metal sheet and the lower layer metal sheet with each other; and spaces between the upper layer metal sheet and the lower layer metal sheet are communicated with each other through the pores.

That is, the above-described "same kind" includes the case in which the plates described in the first method are layered one upon another or the plate described in the second method or the plate described in the third method are layered one upon another. The above-described "different kinds" include the case in which the plate described in the first method and the plate described in the second method are layered one upon another or the plate described in the first method and the plate described in the third method are layered one upon another and the plate described in the second method is layered on the surface at both sides thereof.

In a metal sheet on which burrs are each formed on the peripheral edge of each of the pores by the first method through the third method, a large number of pores is formed by the embossing roll. Thus, the burrs each projecting from the peripheral edge of each pore are present on the substantially entire surface of the metal sheet. When these metal sheets are layered one upon another, the burrs are interlocked with each other and thus the metal sheets can be integrated with one another. Further, the metal sheets layered one upon another through the interlocking of the burrs do not make close contacts, but spaces are generated between layered metal sheets. The spaces communicate with one another through the pores. Thus, when an active substance is charged into the layered metal sheets, the active substance can be reliably charged between the metal sheets.

Further, the present invention provides a plate for a battery electrode manufactured by any one of the above-described methods.

Preferably, there is provided a plate for a battery electrode which is manufactured by the fourth method and comprises a metal sheet, according to the first method, having pores each formed on an apex of each of concave portions and convex portions and burrs each projecting outward from a peripheral edge of each of the pores and metal sheets, according to the second method, having burrs projecting toward one side. The metal sheets according to second method are layered on a surface at both sides of the metal sheet according to the first method and sandwiching the metal sheet according to the first method therebetween. The burrs are projected toward an inner surface side of the metal sheets according to the second method.

Preferably, there is provided a plate for a battery electrode comprises a metal sheet, according to the third method, having burrs each projecting toward both directions from a peripheral edge of each of the pores and metal sheets, according to the second method, having burrs projecting toward one side. The metal sheets according to second method are layered on a surface at both sides of the metal sheet according to the third method and sandwiching the metal sheet according to the third method therebetween. The burrs are projected toward an inner surface side of the metal sheets according to the second method.

Two burr-projected metal sheets may be layered one on the other to project the burrs outward from both sides thereof.

As the center plate sandwiched between the upper and lower plates, it is possible to use the plate manufactured by the first method such that it has a great thickness because of concave portions and convex portions formed thereon or the plate manufactured by the third method such that it has a great thickness because of burrs projected from both sides thereof so as to increase the charge amount of the active substance.

As the upper and lower plates, it is possible to use the plate manufactured by the second method such that it has burrs projected in only one direction so as to project the burrs inward not outward.

In particular,. because the plate manufactured by the first method has fine concave portions and convex portions densely, the charge amount of the active substance can be increased and the active substance-holding force can be increased by filling it into the spaces surrounded with the concave portions and convex portions. Even one metal sheet has an increased application amount of the active substance. Thus, a plate consisting of a plurality of the metal sheets which are layered one upon another can be charged with more active substance. Further, the thickness of the plate for a battery electrode can be easily adjusted by merely adjusting the number of metal sheets which are layered one upon another. Thus, it is possible to provide the plate for a battery electrode which can be charged with a necessary amount of the active substance.

It is preferable to use a metal foil or/and metal sheet which is formed by rolling metal powder into a sheet. That is, a nickel foil, a copper foil, and an aluminum foil can be preferably used as a metal foil.

As the metal sheet which is formed by rolling the metal powder into a sheet, the metal sheet, formed by rolling the metal powder by a pattern roller, proposed by the present applicant and disclosed in Laid-Open Japanese Patent Publication No. 8-122534 can be preferably used. The metal sheet is formed by supplying metal powder to the peripheral surface of one pattern roller of a pair of pressure rollers, and then rolling the metal powder on the peripheral surface of the pressure roller directly by the rotation of a pair of the pressure rollers.

A metal sheet consisting of Ni, Al, Cu, Fe, Ag, Zn, Sn, Pb, Sb, Ti, In, V, Cr, Co, C, Ca, Mo, Au, P, W, Rh, Mn, B, Si, Ge, Se, La, Ga, Ir or an alloy of these elements can be preferably used the above-described metal sheet.

In the plate for a battery electrode manufactured by the first method, it is preferable to set the pitch between the concave portions, and that between the convex portions to 0.5 mm–2.0 mm and the height of the concave portion and that of the convex portion to 0.1 mm–2 mm.

The present invention provides an electrode for a battery in which an active substance is charged into spaces in the plate for a battery electrode. In the electrode, because pores are each formed on the apex of each of fine concave portions and convex portions densely formed on the entire surface of the metal sheet, the pores are charged with the active substance and surrounded with the burrs each formed on the peripheral edge of each of the pores. Thus, the active substance hardly drops from the plate.

The active substance may contain an electrically conductive material. That is, with the increase in the volume of the active substance-application space surrounded with the metal sheets layered one upon another, the charge amount of the active substance increases. Normally, as the active substance does not contain an electrically conductive material, the electrically conductivity is a problem. Thus, it is preferable that the active substance contains the electrically conductive material when the volume of the active substance-application space is great and the active substance has a low electrical conductivity. Further, the present invention provides a battery having the above-described electrode for a battery. Because the electrode is thick and can be charged with a large amount of the active substance, it can be preferably used as the supply battery of an electric vehicle.

BRIEF DESCRIPTION OF THE DRAWINGS

FIG. 2 shows a method of manufacturing each metal sheet constituting the plate of the first embodiment.

FIGS. 3 is a drawing for explaining the shape of concave portions and convex portions which are formed on the metal sheet constituting the plate for a battery electrode of the first embodiment.

BEST MODE FOR CARRYING OUT THE INVENTION

The embodiments of the present invention will be described below with reference to drawings.

FIGS. 1 through 5 show the first embodiment of the present invention. A plate (S) for a battery electrode of the first embodiment is constructed by layering a large number of metal sheets 1 each of which consists of a nickel foil having a thickness 10 $\mu$m–100 $\mu$m (15 $\mu$m in this embodiment) and which has concave portions and convex portions formed on its entire surface by embossing the sheet.

Figure 2A:
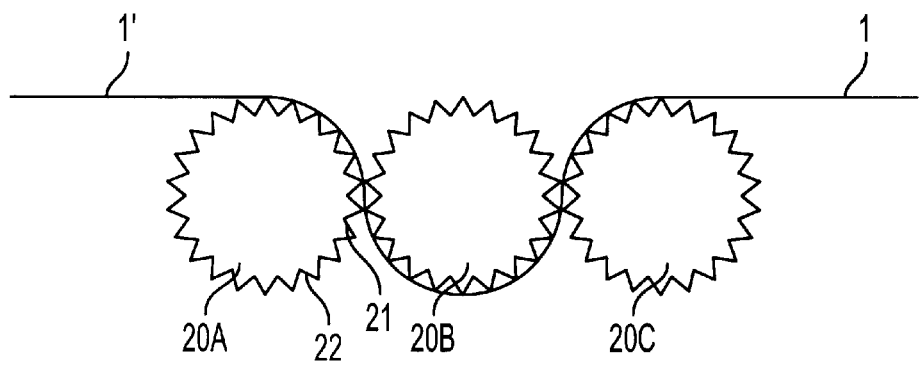
FIG. 2A is a schematic entire view.
Figure 2B:
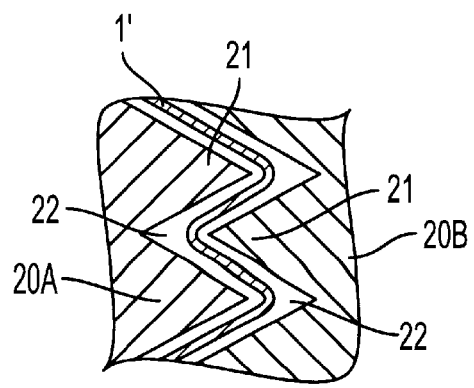
FIG. 2B is a main part-enlarged view.

As shown in FIG. 2, the method of manufacturing each of the above-described metal sheets 1 is carried out by passing a thin flat metal sheet 1' between embossing rolls 20A and 20B and between the embossing roll 20B and an embossing roll 20C. In the above-described embossing rolls 20A, 20B and 20C, pyramidal fine convex portions 21 are densely formed on the entire outer surface thereof, and pyramidal concave portions 22 are formed between the convex portions 21. Initially, when the metal sheet 1' is passed between the embossing rolls 20A and 20B rotating in directions opposite to each other, the convex portion 21 at the embossing roll 20B fits in the concave portion 22 at the embossing roll 20A, with the metal sheet 1' sandwiched between the embossing rolls 20A and 20B. As a result, a convex portion 2 projecting pyramidally and a concave portion 3 concaving pyramidally are formed on the metal sheet 1' at the portion thereof sandwiched between the embossing rolls 20A and 20B. Then, when the metal sheet 1' is passed between the embossing rolls 20B and 20C, the concave portion and convex portion of the embossing roll 20B and those of the embossing roll 20C so fit in each other that a convex portion is formed on the position of the convex portion 2 and that a concave portion is formed on the position of the concave portion 3. By forming the concave portions and the convex portions at two times, the metal sheet 1' is formed into a metal sheet 1 having the pyramidal convex portions 2 and the pyramidal concave portions 3 formed clearly thereon, as shown in FIG. 3.

Figure 3A:
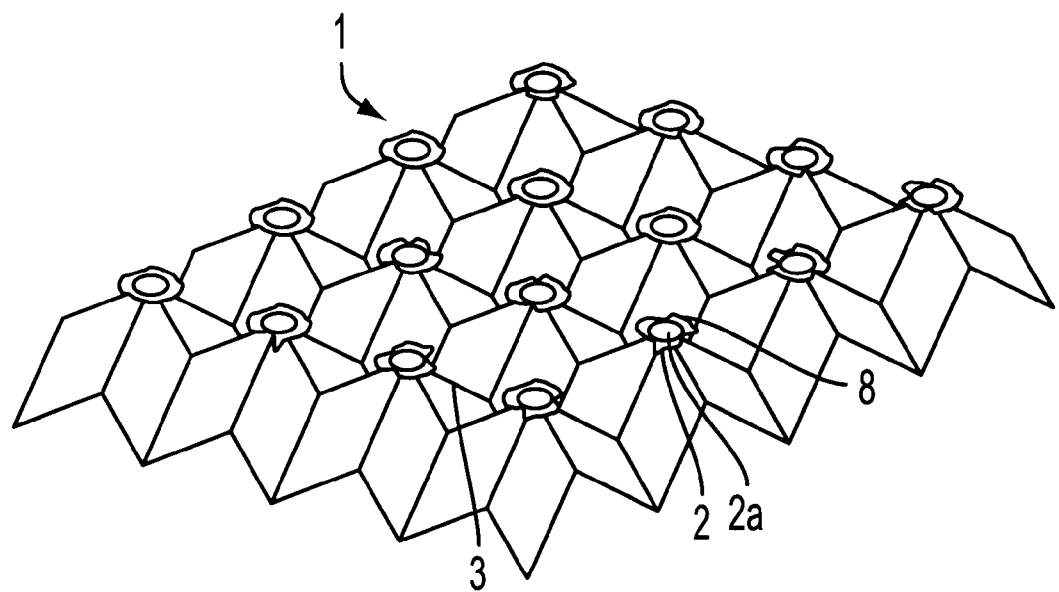
FIG. 3A is a perspective view.
Figure 3B:
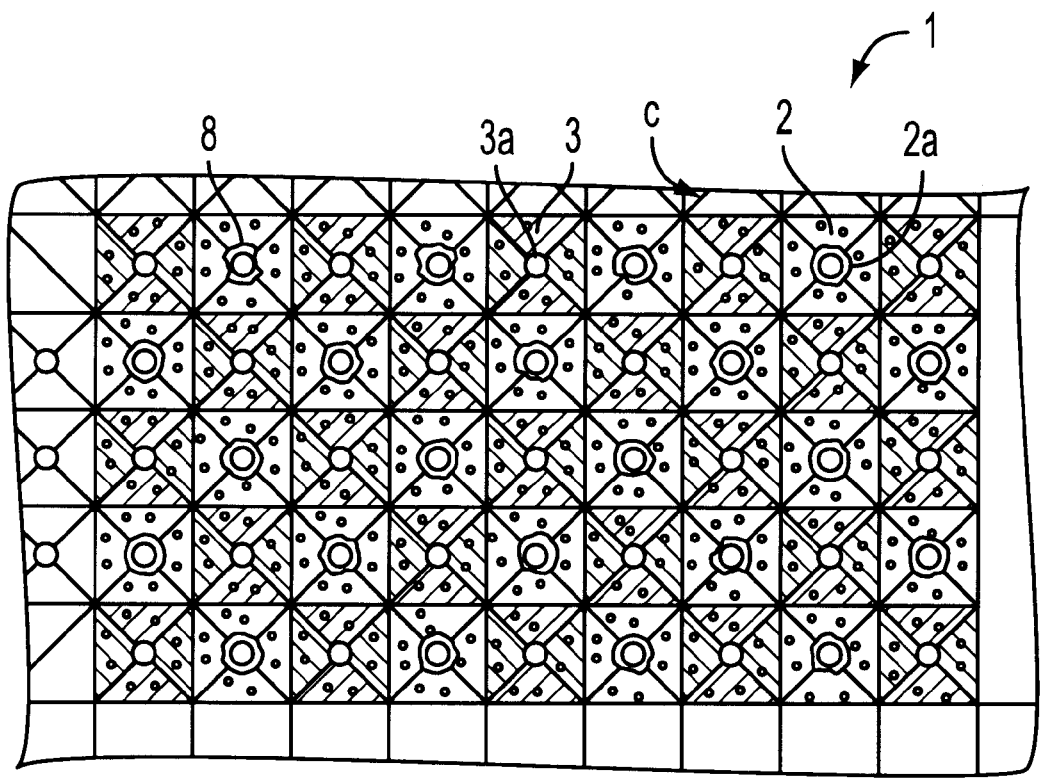
FIG. 3B is a plan view.
Figure 4:
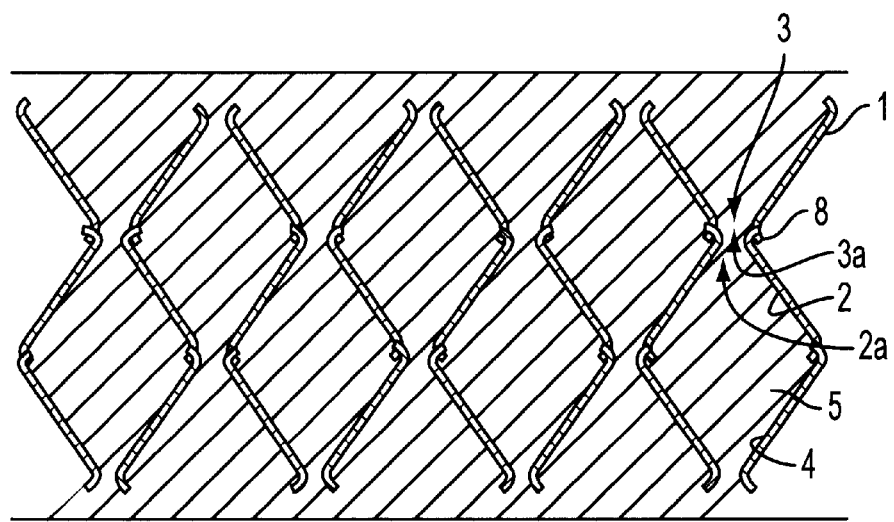
FIG. 4 is a sectional view showing a state in which the plate for a battery electrode of the first embodiment is charged with an active substance to form an electrode.

Further, when the metal sheet 1' is passed between the embossing rolls 20A and 20B and between the embossing rolls 20B and 20C, a pressing force is applied to apexes to form pores 2a and 3a. Due to the formation of the pores, burrs 8 are formed in the peripheral edge of the pores 2a and 3a, thus projecting outward from the peripheral edge of the pores 2a and 3a. Because the pressing force is applied to the same position at two times by the embossing rolls 20A and 20B and the embossing rolls 20B and 20C, the pore can be reliably formed at the apex of each concave portion and each convex portion to which the pressing force is applied at the greatest degree, and the burr can be generated from the peripheral edge of each pore. As described above, as shown in FIGS. 3A and 3B, the pyramidal upward convex portions 2 projected upward and the pyramidal concave portions (downward convex portion) 3 projected downward are formed alternately with each other lengthwise and widthwise. In FIG. 3B, the concave portions 3 are indicated with oblique lines. That is, the periphery of each convex portion 2 is surrounded with the concave portions 3, and each concave portion 3 is surrounded with the convex portions 2 such that the convex portions 2 and the concave portions 3 are continuous with each other to form the metal sheet 1 of only the concave portions 3 and the convex portions 2.

Further, in the embossing shown in FIG. 2, the apex of each of the convex portions 2 and that of each of the concave portions 3 are broken to form the pore 2a on the apex of each of the convex portions 2 and the pore 3a on that of each of the concave portions 3, and the burr 8 spreads outward from the peripheral edge of each of the pores 2a and 3a.

That is, it is possible by one processing to form the concave portions and the convex portions, the pores each at the apex of each of the concave portions and the convex portions, and the burrs 8 each extending outward from the peripheral edge of each pore.

In the first embodiment, the pitch between the convex portions 2 (and pitch between concave portions 3) is 0.7 mm, the height of each convex portion 2 and the depth of each concave portion 3 are also 0.7 mm, and the entire thickness of the metal sheet 1 obtained by the addition of the convex portion 2 and the concave portion 3 is 1.4 mm.

Figure 1:
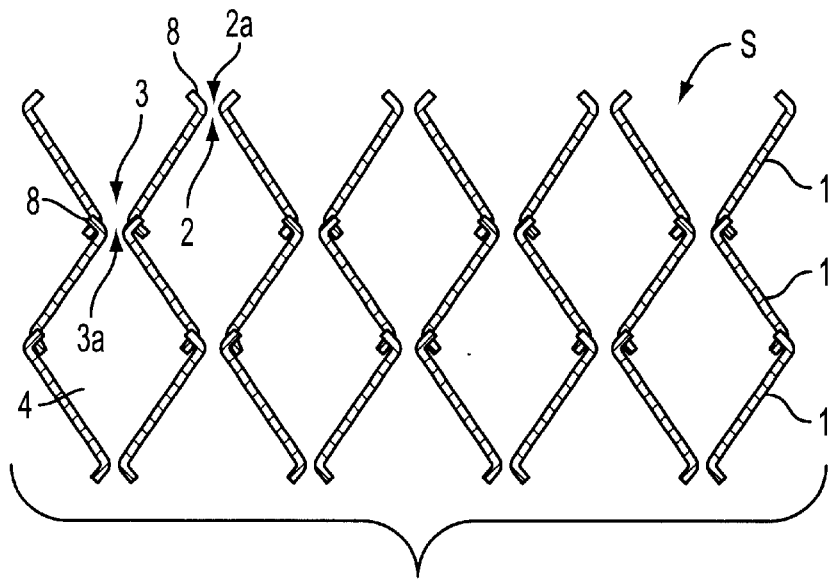
FIG. 1 is a sectional view showing a plate for a battery electrode according to a first embodiment of the present invention.

When the metal sheets 1 are layered vertically one upon another, as shown in FIG. 1, the burrs 8 are interlocked with each other vertically. The burrs 8 are fused into each other (welded to each other) and fixed to each other securely to integrate with each other the metal sheets layered vertically one upon another. In particular, the convex portions 2 and the concave portions 3 are formed at a pitch of 0.7 mm, respectively; the pitch is very short; and the height of the convex portion 2 and the depth of the concave portion 3 are also as small as 0.7 mm. Thus, in the state in which the metal sheets 1 are layered vertically one upon another, the convex portions and the concave portions are hardly coincident with each other, respectively. Further, because the burrs 8 are each projected from the apex of each of the concave portions and convex portions, the metal sheets 1 are layered vertically one upon another not in close contact, but in the state as shown in FIG. 1, with a large number of spaces 4 formed.

In the plate (S) for a battery electrode of the first embodiment consisting of the metal sheets 1 layered one upon another, there are formed the spaces 4 whose periphery is surrounded with the pyramidal convex portions 2 and concave portions 3 of each metal sheet 1 and whose upper and lower open surfaces are surrounded with the metal sheets 1 positioned adjacently to each other; and the spaces 4 communicate with one another through the pore 2a at the apex of the convex portion 2 and the pore 3a at the apex of the concave portion 3. In this manner, it is possible to form the thick plate (S) for a battery electrode having therein a large number of large-volume spaces 4 surrounded with walls consisting of the metal sheets 1.

When an active substance 5 is charged into the plate (S) for a battery electrode having the above-described construction, the active substance 5 can be smoothly charged into the spaces 4 formed by layering metal sheets 1 one upon another through the pores 2a and 3a, because the pore 2a is formed at the apex of each convex portion 2 and the pore 3a is formed at the apex of each concave portion 3. That is, a plate for a battery electrode having the construction shown in FIG. 4 can be formed.

Figure 5:
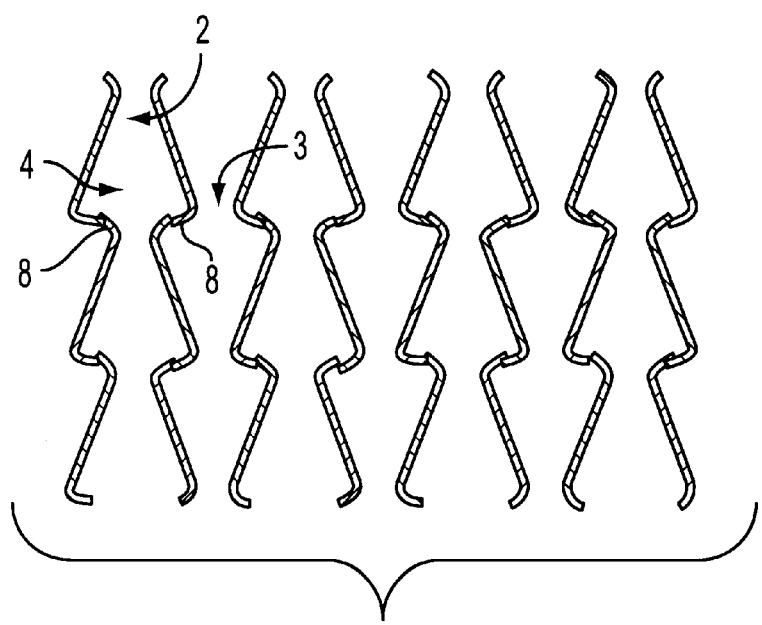
FIG. 5 is a sectional view showing a case in which the layer mode of metal sheets are varied from that of the first embodiment.

As described above, the layer mode of the metal sheets 1 is not limited to that shown in FIG. 1. Even in the state as shown in FIG. 5 in which the convex portion 2 of the upper-layer metal sheet 1 is positioned on the convex portion 2 of the lower-layer metal sheet 1, the burr 8 formed at the peripheral edge of the pore 2a positioned at the upper end of the convex portion 2 of the lower-layer metal sheet 1 is interlocked with the burr 8 formed in the peripheral edge of the pore 3a positioned at the lower end of the concave portion 3, of the upper-layer metal sheet 1, adjacent to the convex portion 2. By fuzing the burrs 8 into each other or welding to each other, it is possible to integrate with one another the metal sheets 1 which are layered one upon another vertically.

Even not in the mode of layering the upper and lower metal sheets shown in FIG. 1 and FIG. 5, i.e., even though the convex portion 2 and the concave portion 3 are spaced at a half pitch, the upper and lower layers can be integrated with each other by interlocking the burr 8 projecting from the peripheral edge of the apex of the concave portion with the burr 8 projecting from the peripheral edge of the apex of the convex portion.

Figure 6:
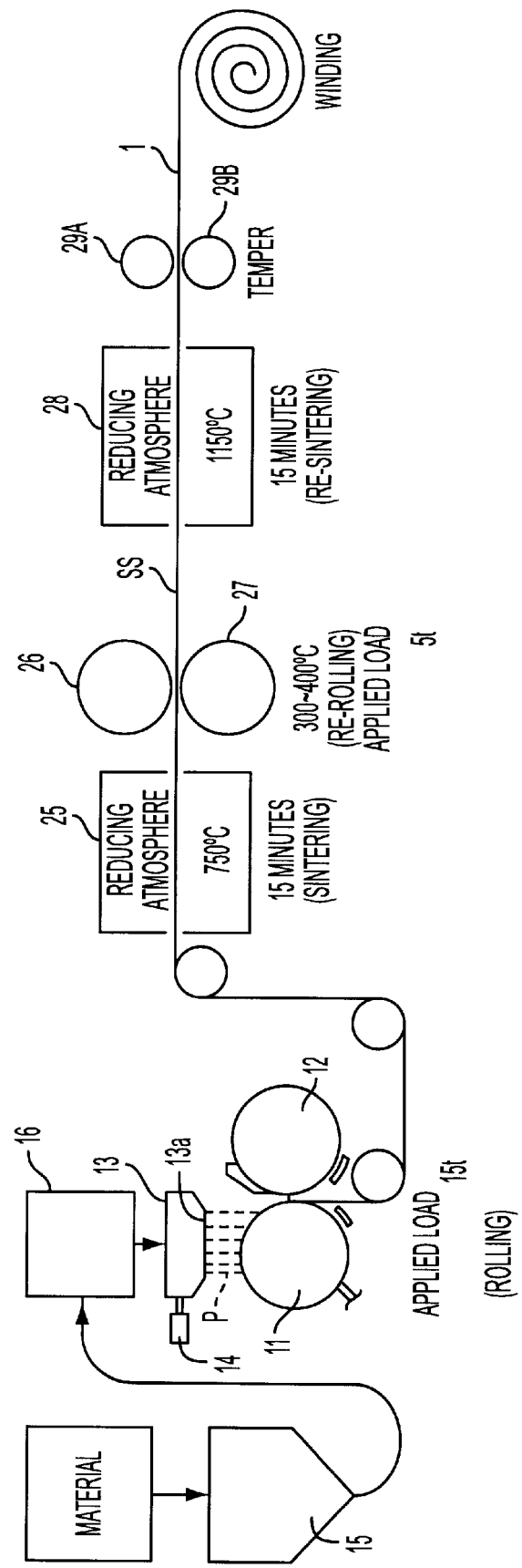
FIG. 6 is a view showing the process of manufacturing a metal powder sheet.

Although the nickel foil is used in the first embodiment, it is also preferable to use a non-porous metal sheet formed of metal powder, by using a pressure roller. The method of manufacturing a metal sheet from the metal powder is carried out by using a pair of flat pressure rollers 11 and 12, as shown in FIG. 6.

That is, above the roller 11, a sieve 13 having a mesh portion 13a formed on the bottom surface thereof is vibrated in a right-to-left direction by a vibrating device 14 supporting the sieve 13 to spread metal powder (P) over the upper surface of the roller 11. To supply the sieve 13 with the metal powder (P), a predetermined amount of the metal powder (P) is supplied from a material hopper 15 to a feeder 16. As the metal powder (P), nickel powder in the shape of spike and having diameters 2–7 $\mu$m is used. The spread metal powder (P) accumulates to a predetermined thickness on the peripheral surface 11b of the roller 11 to form thereon a layer having a predetermined thickness. When a pair of the rollers 11 rotate in contact with the flat roller 12 in this state, at the portion of contact between the roller 11 and the roller 12, the metal powder (P) on the peripheral surface 11b of the roller 11 is compressed by the flat roller 12 at a load of 15 tons and rolled as a thin compressed metal sheet 1'.

The metal sheet 1' rolled by the pressure rollers is continuously fed to a sintering oven 25 in which it is sintered by heating it in a nonoxidizing atmosphere at 750° C. for about 15 minutes. Thereafter, the metal sheet 1' is passed between pressure rollers 26 and 27 each consisting of a flat roller heated to 300° C.–400° C. to roll it again by applying a load of five tons thereto while the metal sheet 1' is being heated. Then, the metal sheet 1' is continuously fed into a sintering oven 28 to sinter it in a nonoxidizing atmosphere at 1,150° C. for about 15 minutes. Thereafter, it is passed between a pair of tempering rollers 29A and 29B to level the thickness of the metal sheet 1' so that it has a required thickness. Then, the metal sheet 1' is wound as a coil. By uncoiling the metal sheet 1' and performing the above-described embossing, the metal sheet 1' is allowed to have the construction shown in FIGS. 2 and 3. Then, the embossed metal sheets 1 are layered one upon another vertically, and the burrs 8 are interlocked with each other to fix the burrs 8 to each other. In this manner, the plate (S) for a battery electrode having the required thickness can be manufactured.

Needless to say, the convex portion 2 and the concave portion 3 may be pyramidal similarly to the first embodiment or conic.

Figure 7A:
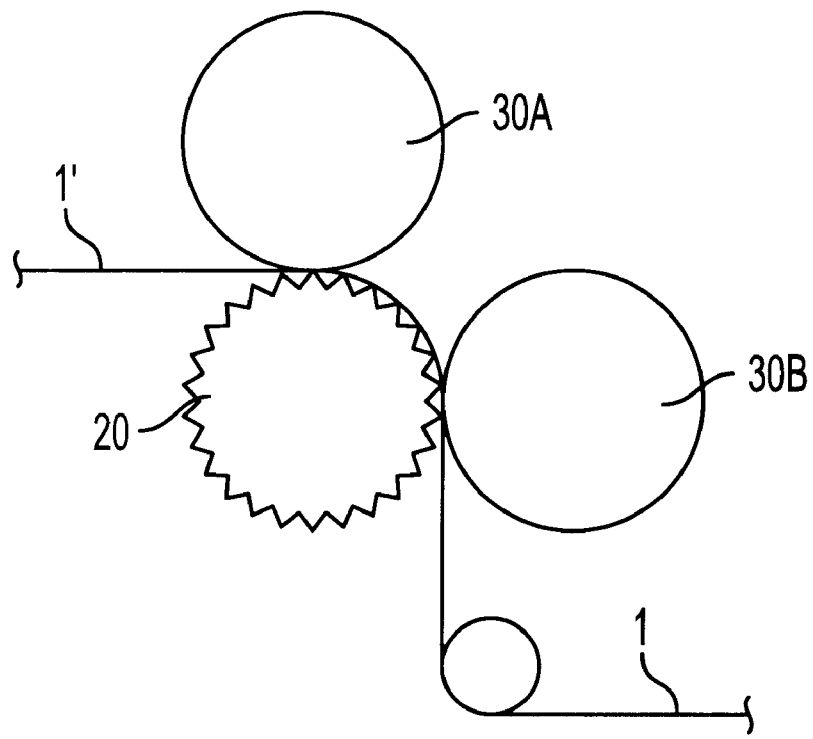
FIGS. 7(A) and (B) are schematic views showing a manufacturing method of a second embodiment.
Figure 7B:
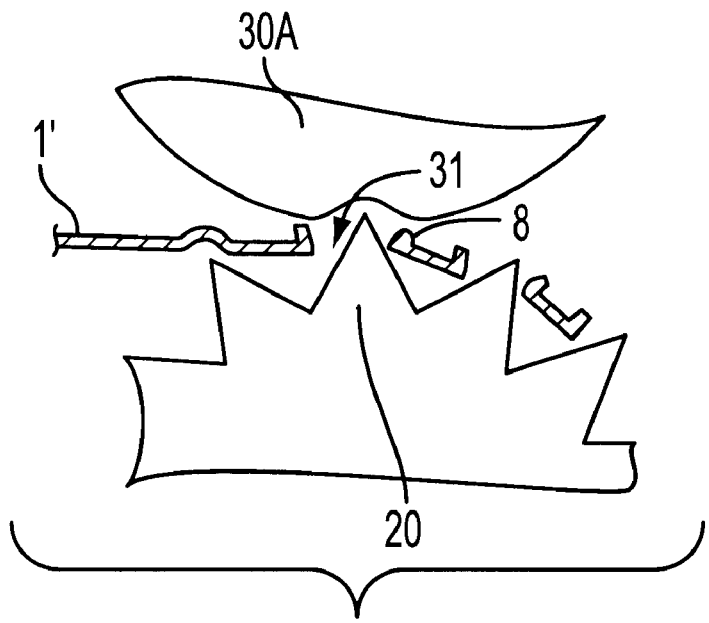
Figure 8:
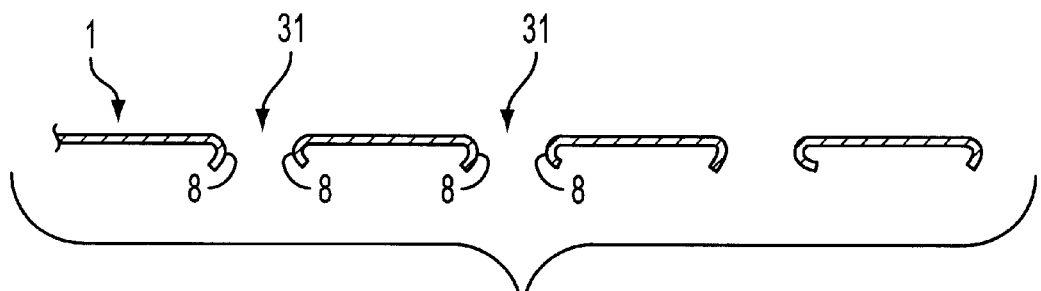
FIG. 8 is a sectional view showing a plate manufactured in the second embodiment.

FIGS. 7 through 10 show the second embodiment. In the second embodiment, as shown in FIG. 7, rubber rolls 30A and 30B having a smooth surface are positioned in confrontation with an embossing roll 20; and as shown in FIG. 8, a large number of pores 31 is formed on a flat metal sheet 1' and burrs 8 each projecting in one direction from the peripheral edge of each pore 31 are formed.

As shown in FIGS. 7A and 7B, when the metal sheet 1' is passed between the embossing roll 20 and the rubber roll 30A, it is pressed by the rubber roll 30A. As a result, the metal sheet 1' strikes against convex portions 21 of the embossing roll 20, and thus pores 31 are formed thereon. The burrs 8 which are generated as a result of the formation of the pore 31 project toward the rubber roll 30A. Thus, the direction of the burrs 8 formed on the periphery of the pore 31 is restricted to one direction (rubber roll side).

When the metal sheet 1' is passed between a pair of the embossing roll 20 and the rubber roll 30B, the convex portions 21 of the embossing roll 20 are pressed by the rubber roll 30B again. Thus, the formation of the pores 31 which have been made by the pressing contact between the rubber roll 30A and the embossing roller can be completed, and the burrs 8 are pressingly spread toward the rubber roll 30B.

Figure 9:
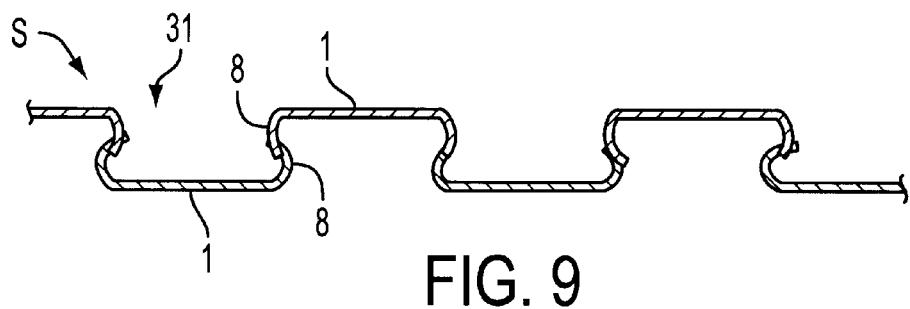
FIG. 9 is a sectional view showing a state in which the plates of the second embodiment are layered on each other.

The metal sheets 1 manufactured as described above and shown in FIG. 8 are layered vertically one upon another as shown in FIG. 9, and the burrs 8 are interlocked with each other, with the burrs 8 of the lower metal sheet 1 directed upward and the burrs 8 of the upper metal sheet 1 directed downward. Then, the burrs 8 interlocked with each other are fused into each other or welded to each other to integrate them with each other. As a result, spaces 4 can be formed between the upper metal sheet 1 and the lower metal sheet 1.

When an active substance is charged into a plate (S) for a battery electrode having the construction shown in FIG. 9, the active substance is charged into the spaces 4 between the upper metal sheet 1 and the lower metal sheet 1 through the pores 31 thereof. The active substance charged into the space 4 is held reliably by the metal sheets 1 at both sides of the space 4.

Figure 10:
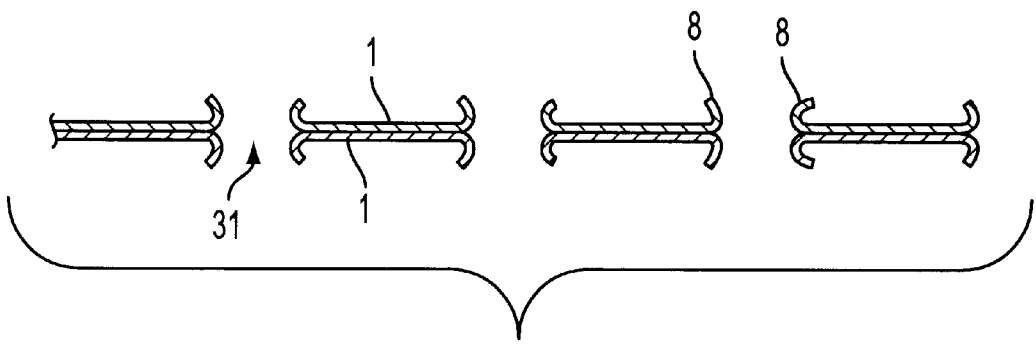
FIG. 10 is a sectional view showing a modification of the second embodiment.

Further, as shown in FIG. 10, it is possible to project the burrs 8 in both outward directions and layer them one on the other, with the pores 31 communicating with each other. In this case, the active substance is applied between the burrs 8 projecting in both outward directions and can be reliably held by the burrs 8.

Figure 11:
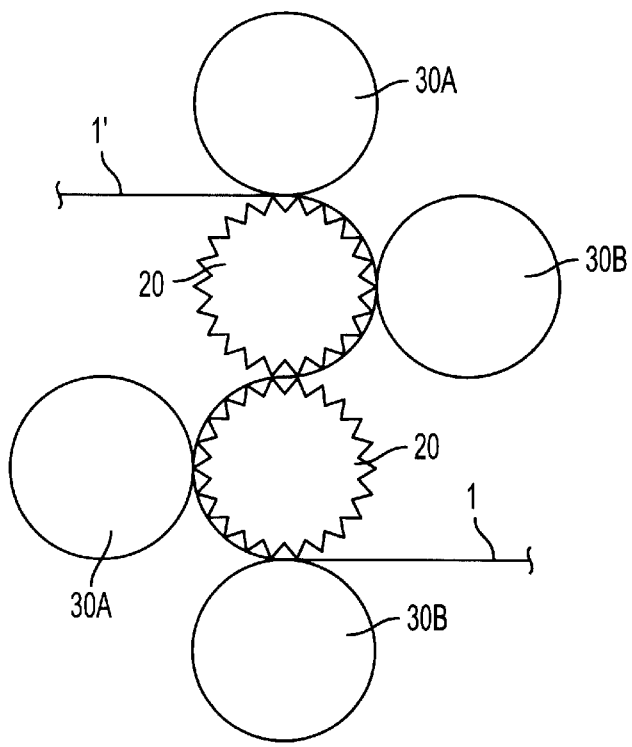
FIG. 11 is a schematic view showing a manufacturing method of a third embodiment.
Figure 12:
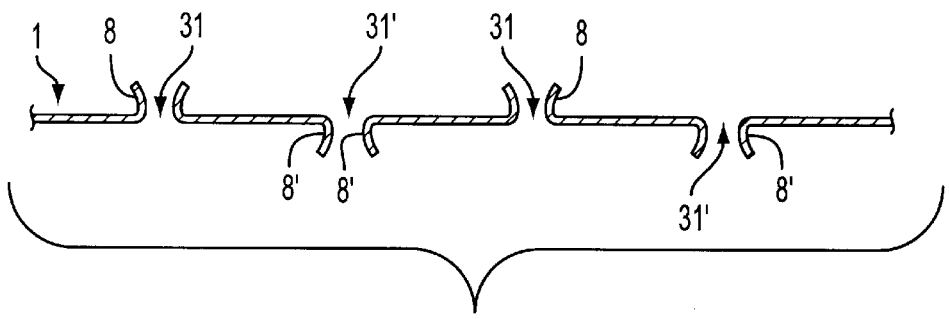
FIG. 12 is a sectional view showing a plate manufactured in the third embodiment.
Figure 13:
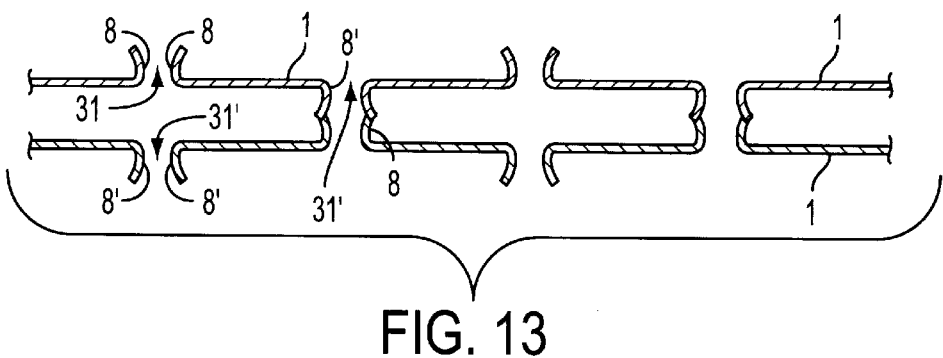
FIG. 13 is a sectional view showing a state in which the plates of the third embodiment are layered on each other.

FIGS. 11 through 13 show the third embodiment. As shown in FIG. 11, two sets each consisting of one embossing roll 20 and two rubber rolls 30A and 30B of the second embodiment shown in FIG. 7 are provided in the third embodiment. In a first set (I), pores 31 are formed and burrs 8 projecting toward the rubber roll 30A side are each formed in the peripheral edge of each pore 31; in a second set (II), pores 31' are formed on the metal sheet 1' at different positions thereof, and burrs 8' projecting toward the rubber roll 30B side and in the direction opposite to the projected direction of the burr 8 are each formed in the peripheral edge of each pore 31'.

When the metal sheets 1 manufactured as described above and shown in FIG. 12 are layered vertically one on the other, as shown in FIG. 13, the lower burrs 8 and the upper burrs 8 are interlocked with each other. Then, the burrs 8' interlocked with each other are fused into each other or welded to each other to integrate them with each other. As a result, spaces are formed between the upper metal sheet 1 and the lower metal sheet 1. When an active substance is charged into the plate (S) for a battery electrode, the active substance is charged into the spaces formed between the upper metal sheet 1 and the lower metal sheet 1 through the pores 31 and 31' thereof and can be held reliably by the upper metal sheet 1 and lower metal sheet 1. It is possible to project the burrs 8 of the upper and lower metal sheets 1 in both outward directions, with the upper metal sheet 1 and the lower metal sheet 1 layered on each other. In this case, the active substance is charged between the burrs 8 projecting in both outward directions and can be held by the burrs 8.

Figure 14A:
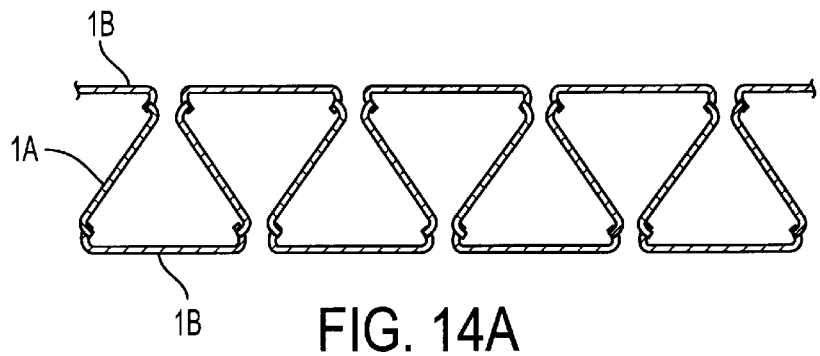
FIGS. 14A, 14B, and 14C are sectional views each showing a modification of the layer mode.
Figure 14B:
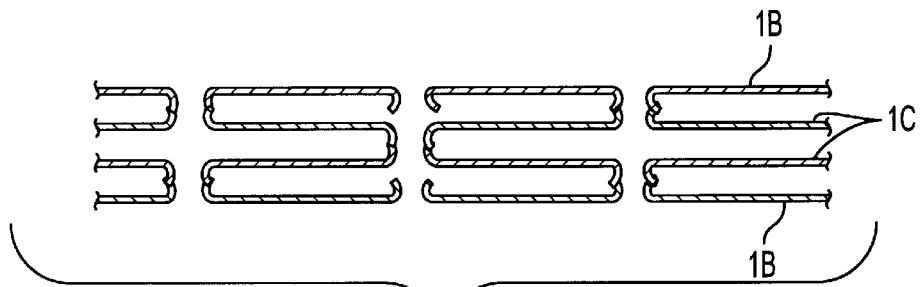
Figure 14C:
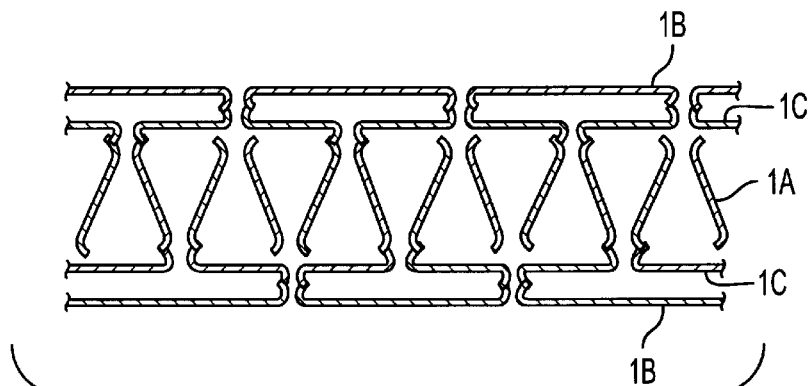

In the plate (S) for a battery electrode of the first through third embodiments, the metal sheets 1 of the same kind are layered with each other. As shown in FIGS. 14A through 14C, the metal sheet 1A having concave portions and convex portions, pores, and burrs formed thereon and manufactured by the method of the first embodiment, the metal sheet 1B having pores and burrs formed thereon in one direction and manufactured by the method of the second embodiment, and the metal sheet 1C having pores and burrs formed thereon in both directions and manufactured by the method of the third embodiment are combined with one another to form the plate (S) for a battery electrode having a thickness.

That is, in the plate (S) for a battery electrode shown in FIG. 14A, the metal sheet 1B of the second embodiment is located at the upper and lower sides of the metal sheet 1A of the first embodiment, with the metal sheet 1A sandwiched between the metal sheets 1B; and the burrs 8 of the metal sheet 1B are directed inward not outward.

In the plate (S) for a battery electrode shown in FIG. 14B, two metal sheets 1C of the third embodiment are layered one on the other; the metal sheet 1B of the second embodiment is located at the upper and lower sides of the metal sheet 1C; and the burrs 8 of the metal sheet 1B are directed inward not outward.

In the plate (S) for a battery electrode shown in FIG. 14C, the metal sheet 1A of the first embodiment is located at the center thereof; the metal sheet 1C of the second embodiment is located at both outer sides of the metal sheet 1A; and the metal sheet 1B of the second embodiment is located at both outer sides of the metal sheet 1C. The burrs 8 of the metal sheet 1B located outermost are directed inward not outward.

Figure 15:
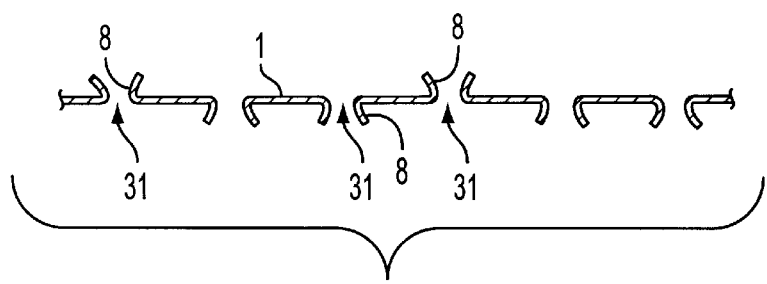
FIG. 15 is a view showing a modification of a metal sheet which is embossed.

Needless to say, as shown in FIG. 15, the shape of the metal sheet 1 which is manufactured by the embossing roll may be formed by varying at random the projection direction of the burrs 8 which are each formed on the peripheral edge of each of the pores 31.

INDUSTRIAL APPLICABILITY

As apparent from the foregoing description, in the method of manufacturing a plate for a battery electrode according to the present invention, by using an embossing roll, many fine pores are densely formed and burrs can be each generated on the periphery of each pore when many fine pores are formed.

Thus, in one processing step, it is possible to easily manufacture the plate for a battery electrode having fine pores densely formed thereon, having a high open area ratio, and having burrs finely generated at a high occupation percentage.

In particular, in the first method of the present invention, concave portions and convex portions are formed simultaneously, pores are each formed on the apex of each of the concave portions and convex portions, and burrs can be each formed on the peripheral edge of each of the pores to make the apparent thickness of the plate for a battery electrode great by means of the concave portions and convex portions and the burrs. Thus, it is easy to manufacture the plate for a battery electrode into which an increased amount of an active substance can be charged. More specifically, it is possible to allow the thickness of the plate for a battery electrode three to 500 times as great as that of a flat metal sheet.

When the plates manufactured by the method of the present invention are layered one upon another, the burrs are interlocked with each other and the burrs interlocked with each other are fused into each other or welded to each other to integrate plates with one another easily. Thus, the plate for a battery electrode having an integrated layered structure can be manufactured easily. Further, by adjusting the number of metal sheets which are layered one upon another, the plate having a desired thickness can be obtained.

Even a plate for a battery electrode manufactured by the manufacturing method of the present invention and consisting of one sheet has many fine pores formed densely. Because an active substance is charged into the pores, the active substance hardly drops from the plate. Further, because the burrs are formed on the peripheral edge of each pore and the occupation percentage of the burr is high, the active substance applied to both surfaces of the sheet is held by the burrs and thus hardly drops from the sheet.

In particular, in the plate consisting of a plurality of sheets layered one upon another, the active substance charged into spaces between the sheets is sandwiched between the sheets. Thus, the active substance hardly drops from the plate. Further, when the number of sheets which are layered one upon another is increased, the plate having a desired thickness can be formed and moreover, the charge amount of the active substance can be dramatically increased because spaces are present between the sheets of the thick plate. Therefore, the application amount of the active substance in the thickness direction thereof can be allowed to be greater than that of the active substance which is applied to a conventional flat metal sheet. Thus, the plate has an improved electricity-collecting performance, thus being capable of accomplishing a rapid charging and discharging.

When the plate is charged with the active substance, it can be smoothly charged because the spaces between the sheets communicate with each other through the pores.

What is claimed is:

1. A method of manufacturing a plate for a battery electrode comprising the steps of: passing a thin metal sheet between a pair of rotation rollers comprising an embossing roller having concave portions and convex portions formed on a peripheral surface thereof and a rubber roller having smooth outer surface to form pores on said metal sheet and generate burrs each projecting toward one side from a peripheral edge of each of said pores by pressing said rubber roller against said convex portions of said embossing roller;

wherein metal sheets having said pores and said burrs each projecting from the peripheral edge of each of said pores are layered one upon another; and said burrs of an upper layer metal sheet and said burrs of a lower layer metal sheet adjacent to said upper layer metal sheet are interlocked with each other to integrate said upper layer metal sheet and said lower layer metal sheet with each other; and spaces between said upper layer metal sheet and said lower layer metal sheet are communicated with each other through said pores.

2. A method of manufacturing a plate for a battery electrode comprising the steps of: passing a thin metal sheet sequentially between first and second sets of rotation rollers each consisting of an embossing roller having concave portions and convex portions formed on a peripheral surface thereof and a rubber roller having smooth outer surface to form pores on said metal sheet and generate burrs each projecting toward one side from a peripheral edge of each of said pores by pressing said rubber roller against said convex portions of said embossing roller when said metal sheet is passing between the embossing roller and the rubber roller of said first set; and passing said metal sheet between the embossing roller and the rubber roller of said second set to form pores on said metal sheet at different positions thereof and generate burrs each projecting toward the other side from said peripheral edge of each of said pores, wherein metal sheets having said pores and said burrs each projecting from the peripheral edge of each of said pores are layered one upon another; and said burrs of an upper layer metal sheets and said burrs of a lower layer metal sheet adjacent to said upper layer metal sheet are interlocked with each other to integrate said upper layer metal sheet and said lower layer metal sheet with each other; and spaces between said upper layer metal sheet and said lower layer metal sheet are communicated with each other through said pores.

3. A method of manufacturing a plate for a battery electrode comprising the steps of: passing a thin metal sheet between a pair of embossing rotation rollers having concave portions and convex portions formed on a peripheral surface thereof to form concave portions and convex portions on an entire surface of said metal sheet, and form pores each on an apex of each of said concave portions and convex portions and generate burrs each projecting outward from a peripheral edge of each of said pores by a pressing force during formation of said concave portions and convex portions;

wherein metal sheets having said pores and said burrs each projecting from the peripheral edge of each of said pores are layered one upon another; and said burrs of an upper layer metal sheet and said burrs of a lower layer metal sheet adjacent to said upper layer metal sheet are interlocked with each other to integrate said upper layer metal sheet and said lower layer metal sheet with each other; and spaces between said upper layer metal sheet and said lower layer metal sheet are communicated with each other through said pores.

* * * * *